United States Patent [19]
Du

[11] Patent Number: 6,034,951
[45] Date of Patent: Mar. 7, 2000

[54] LOCAL AREA NETWORK COMPRISING RADIO TRANSMISSION TERMINALS

[75] Inventor: Yonggang Du, Aachen, Germany

[73] Assignee: U.S. Philips Corporation, New York, N.Y.

[21] Appl. No.: 08/922,824

[22] Filed: Sep. 3, 1997

[30] Foreign Application Priority Data

Sep. 12, 1996 [DE] Germany .......................... 196 37 026

[51] Int. Cl.[7] .................................................. H04B 7/212
[52] U.S. Cl. ........................ 370/328; 370/396; 370/401; 455/422
[58] Field of Search .................................... 370/328, 338, 370/395, 396–397, 399, 329, 310, 401; 455/33.1, 33.2, 54.2, 422

[56] References Cited

U.S. PATENT DOCUMENTS 5,537,399  7/1996  Du ........................................... 370/396

FOREIGN PATENT DOCUMENTS

0388511A2  9/1989  European Pat. Off. ........ H04L 12/46
0660567A2  6/1995  European Pat. Off. ........ H04L 12/28

OTHER PUBLICATIONS

K.Y. Eng et al., "A Wireless Broadband AD–HOC ATM Local–Area Network", Wireles Networks, Jul. 1995, pp. 161–173.

*Primary Examiner*—Chi H. Pham
*Assistant Examiner*—Maikhanh Tran
*Attorney, Agent, or Firm*—Gregory L. Thorne

[57] ABSTRACT

The invention relates to a local area network operating in the asynchronous transfer mode comprising a plurality of terminals (1 to 4) which are formed each by a station (5), a radio device (7) for transmitting data between the terminals (1 to 4) and a network interface (6) including a controller (8) at least provided for setting up a connection, and comprising a switch unit (9) for switching cells between radio device (7), station (5) and controller (8). To effect a fast data transmission, the terminals (1 to 4) are provided each for a direct data exchange with another terminal (1 to 4). One terminal (1 to 4) then executes management functions in the network and exchanges data by means of at least one virtual link between a local user and a user of another terminal (1 to 4).

11 Claims, 4 Drawing Sheets

LOCAL AREA NETWORK COMPRISING RADIO TRANSMISSION TERMINALS

BACKGROUND OF THE INVENTION

The invention relates to a local area network operating in the asynchronous transfer mode comprising a plurality of terminals which are formed each by a station, a radio device for transmitting data between the terminals and a network interface including a controller at least provided for setting up a connection, and comprising a switch unit for switching cells between radio device, station and controller.

A Local Area Network LAN operating in the asynchronous transfer mode is known from EP 0 660 567 A2. This network comprises network interfaces which include each a transmitter device for transmitting cells between the individual network interfaces. Cells are transmitted according to a ring principle. A network interface always transmits cells via the ring, ie always to a neighbouring network interface. If necessary, the cells are to be transferred to their destination via a plurality of other network interfaces. For the load-dependent assignment of time slots for the transmission of cells, a distribution means assigns time slots to the network interfaces.

OBJECT AND SUMMARY OF THE INVENTION

It is an object of the invention to provide a local area network having a faster data transmission.

The object is achieved by a local area network of the type defined in the opening paragraph, operating in the asynchronous transfer mode, in that the terminals are provided each for directly exchanging data with another terminal and in that one terminal executes management functions in the network and exchanges data by means of at least one virtual link between a local user and a user of another terminal.

According to the invention, data are exchanged directly between two terminals inside the network and not via further terminals inserted therebetween. Neither is there a further switch element for channel distribution. One terminal, which is always dynamically selected in dependence on the respective state of the local area network, executes management functions. One management function is, for example, setting up or clearing down a connection. This does not need a distribution means of necessity. The terminal for executing the management functions may further also exchange data with another terminal via at least one virtual link.

The cells (ATM cells) ready for radio transmission in a terminal obtain control indication bits and auxiliary information and are fed to the radio link as a packet unit. A packet unit may then comprise part of a cell, a complete cell or a plurality of cells. The TDMA, the FDMA or the CDMA method (TDMA=Time-Division Multiple Access; FDMA= Frequency-Division Multiple Access; CDMA=Code-Division Multiple Access) may be used for the radio transmission. The methods may also be combined, as appropriate.

The switch unit transports the cells received in a radio device of a terminal to the station or to the controller. For this purpose, a switching takes place of signalling cells which are appropriate, for example, for setting up or clearing down a connection, and user cells which contain user information for an existing connection. Thus there are two types of cells available: a signalling cell and a user cell.

According to the invention, a plurality of terminals may be present in a radio coverage area. They may be switched on or off at random, without creating further costly wire junctions, so that the local area network becomes flexible to the user. A user is understood to mean, for example, a user of a program in a terminal, a program itself, stored data (terminal as a data bank), but also a telephone user.

A local area network may comprise various sub-networks having each a plurality of terminals, for enlarging the radio coverage area of a sub-network. At least one terminal is then part of two adjacent sub-networks and is provided for transmitting cells between the sub-networks.

The switch unit comprises a first receive circuit assigned to an output connection of the station, which receive circuit is coupled to a first path memory, and a second receive circuit assigned to a receive connection of the network interface, which receive circuit is coupled to a second path memory. Each receive circuit is used for evaluating the header field of a received cell. A receive circuit is used for extracting a switch mode from the assigned path memory at least on the basis of the information recovered from the header field.

The two path memories may store switch modes for various virtual links. Six switch modes are provided for the first path memory. A first switch mode is used for a connection from the station and back, in which mode the switch unit couples the output and input connections of the station. A second switch mode is used for a connection from the station and back and from the station to another terminal, in which mode the switch unit couples the output connection of the station to the input connection of the station and to the transmit connection of the network interface. A third switch mode is used for a connection between the station and at least one other terminal, in which mode the switch unit couples the output connection of the station to the transmit connection of the network interface. A fourth switch mode is used for a connection between the station and the local controller, in which mode the switch unit couples the output connection of the station to the local controller. A fifth switch mode is used for a connection between the station and the local controller and at least one controller of another terminal, in which mode the switch unit couples the output connection of the station to the local controller and to the transmit connection of the network interface. A sixth switch mode is used for deleting cells coming in from the station and containing non-existent connections.

For the second path memory, there are three switch modes. A seventh switch mode is used for a connection from the radio interface to the station, in which mode the switch unit couples the receive connection of the network interface to the receive connection of the station. An eighth switch mode is used for a connection between the radio interface and the local controller, in which mode the switch unit couples the input connection of the network interface to the local controller. A ninth switch mode is used for deleting cells coming in from the receive connection of the network interface and containing non-existent connections.

The second path memory is a terminal which forms part of at least two adjacent sub-networks and is additionally used for storing a tenth switch mode for a connection between a terminal of a first sub-network and a terminal of a second sub-network, in which mode the switch unit couples the receive and transmit connections of the network interface.

The switch modes for a virtual link are established while the connection is being set up. A switch mode for a virtual link is stored in a path memory under the influence of the respective controller. The path memory is then used for storing the type of connection, the type of cell and the switch mode under the feature of a virtual link. A virtual link is featured by the combination of the VCI (Virtual Channel Identifier) and VPI (Virtual Path Identifier) contained in the header field of a cell. The type of connection indicates whether a unicast connection, ie point-to-point connection, a multicast connection, ie point-to-multipoint connection or broadcast connection, is effected.

A terminal includes a radio device with a radio frequency circuit, a modem and a protocol device. The radio devices of two terminals are provided for exchanging data. A terminal then transmits identification data over a recording channel, MAC signalling data (MAC=Medium Access Control) over a MAC signalling channel and payload information over at least one transport channel. The payload information contains at least part of a cell. The terminal provided for executing management functions informs a terminal over the MAC signalling channel, for example, of the transport channels appropriate for the transmission of payload information. Thus the terminal provided for executing management functions is used for controlling the connection set-up or disconnection and for dynamically assigning transport channels for the individual terminals.

The invention likewise relates to a terminal for a local area network operating in the asynchronous transfer mode, the network comprising a plurality of further terminals, a station, a radio device for exchanging data with other terminals and a network interface which includes a controller provided at least for the connection set-up and a switch unit for switching cells between radio device, station and controller. The terminal is used for the direct exchange of data with another terminal and is used for executing management functions in the network and for exchanging data by means of at least one virtual link between its own user and a user of another terminal.

These and other aspects of the invention will be apparent from and elucidated with reference to the embodiments described hereinafter.

DETAILED DESCRIPTION OF THE PREFERRED EMBODIMENT

Figure 1:
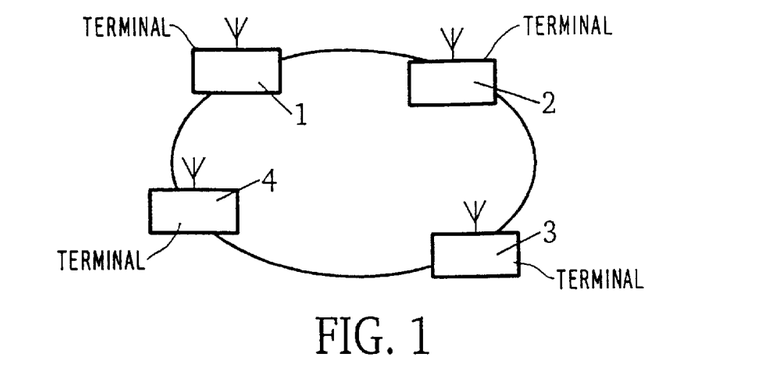
FIG. 1 shows a local area network comprising terminals communicating via radio links.

FIG. 1 shows an embodiment for a local area network comprising 4 terminals 1 to 4 which exchange data via radio links. The ellipse shown in FIG. 1 and including the terminals 1 to 4 is to denote the radio coverage area in which an error-free radio transmission is possible between two terminals (1 to 4).

Figure 2:
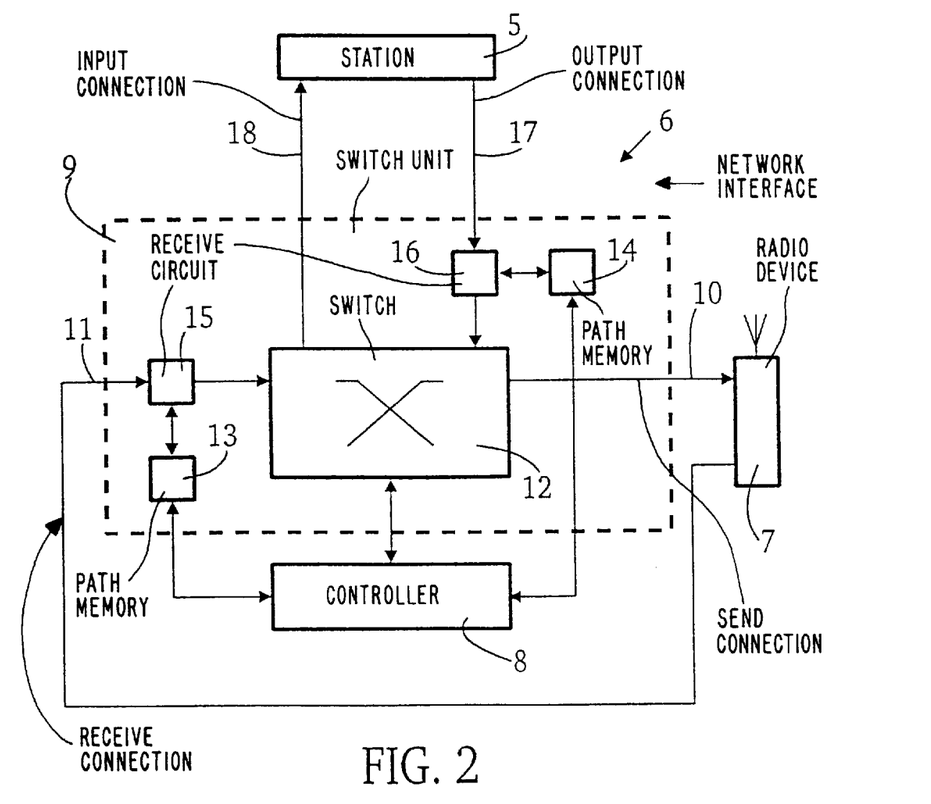
FIG. 2 shows a block circuit diagram of a terminal which can be used in a local area network shown in FIG. 1.

A terminal 1 to 4 shown in FIG. 1, which comprises a station 5, a network interface 6 and a radio device 7 is shown in more detail in FIG. 2. The station 5 may be, for example, a videophone, a Personal Computer, a work station or a telephone. The network interface 6 comprises a controller 8 and a switch unit 9 which is coupled to the radio device 7 via a send connection 10 and a receive connection 11 and switches cells generated in the asynchronous transfer mode.

A cell comprises a header field of, for example, 5 bytes and an information field of, for example, 48 bytes. The information contained in the header field of the cell is especially used for addressing and for executing switch functions.

Cells may be generated either by the controller 8, or the station 5, and be received by the radio device 7 via the radio link. The controller 8, which may be arranged as a microprocessor, is used, for example, for connecting and disconnecting virtual links, for example, between two users of different terminals.

The switch unit 9 further includes a switch 12, two path memories 13 and 14 and two receive circuits 15 and 16. The receive circuit 15 is connected to the receive connection 11, to an input of the switch 12 and to the path memory 13. An output of the switch 12 is connected to the transmit connection 10. The receive circuit 16, which is coupled to the path memory 14, is arranged between an output connection 17 of the station 5 and to a further input of the switch 12. The input connection 18 of the station is connected to a further output of the switch.

The header fields of the cells coming in via the receive connection 11 and the output connection 17 are evaluated in the receive circuits 15 and 16. Address information contained in the header field is used for addressing various tables for the path memories 13 and 14 connected to the receive circuits 15 and 16. The data stored in the tables are used by the respective receive circuits 15 and 16 to organize the further processing and transfer of the cell. For example, the receive circuit 16 can copy a cell and give it new address information. The original cell is returned, for example, via the switch 12 to the radio device 7 and the copied cell is returned to the station 5 via the switch 12. There is still an option for the switch 12 to execute functions like this copy function. The receive circuit 15 conveys cells received from the radio device 7 to the switch 12.

Two types of payload cells are transmitted in the switch unit 9. On the one hand, user cells carrying in their information field, for example, messages or user data of a connection previously set up and, on the other hand, signalling cells carrying overhead bytes in their information field.

Certain bits in the header field of a cell are reserved for the VCI (Virtual Channel Identifier) and for VPI (Virtual Path Identifier). The VPI indicates a group of virtual links. According to current standardization, 8 bits are reserved for the VPI in the header field of the cell and 16 bits for the VCI.

In this embodiment, the VPI and the VCI together feature a virtual link between at least two users by a number, and the VPI and VCI are determined during the connection set-up. A user is understood to mean, for example, a user of a program in a Personal Computer, a program itself, stored data (station as a data bank), or also a telephone subscriber. Additionally, the VPI indicates a group of virtual links. When a connection is set up, certain attributes, which are assigned to the links featured by the VPI and VCI, are stored in the tables of the path memories 13 and 14. An attribute indicates, for example, the type of connection of a virtual link.

A type of connection is a unicast connection, a multicast connection or a broadcast connection. A unicast connection, or end-to-end connection, is a virtual link from a user of a first terminal to a user of a second terminal. A multicast connection, or point-to-multipoint connection, occurs when a plurality of users of terminals are connected to each other.

With a broadcast connection, a transmitter terminal delivers cells having the same content in the information field to all other terminals.

Figure 3:
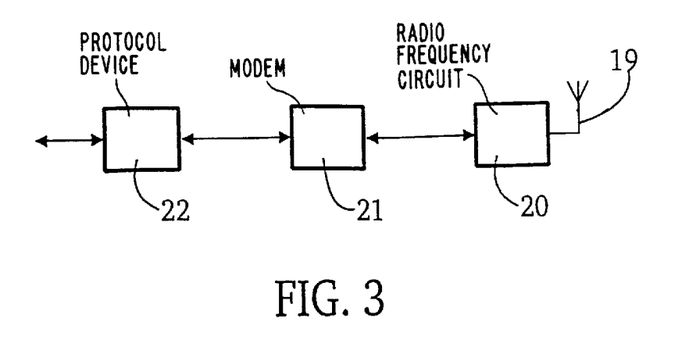
FIG. 3 shows a block circuit diagram of a radio device which can be used in a terminal shown in FIG. 2, FIGS. 4, 5, 7 show various switch modes of a network interface contained in a terminal shown in FIG. 2.

The radio device 7 in a terminal 1 to 4 comprises an antenna 19, a radio frequency circuit 20, a modem 21 and a protocol device 22 (FIG. 3). Except for the protocol device 22, the other circuit elements 19 to 21 of the radio device 7 do not need further explanation, because they are circuit elements known from other radio devices. The protocol device 22 forms packet units from the received ATM cell stream, which units contain each at least parts of an ATM cell and control indication bytes and uses error-reducing protocols suitable in a radio transmission medium for the multiple access. These protocols relate to the OSI layer model. The security layer of the OSI layer model is relevant here. It includes at least two further sub-layers: LLC and MAC layers. The MAC layer controls the Multiple ACcess of the terminals to the transmission medium (radio transmission medium). The LLC layer (LLC=Logic Link Control) carries out a flow and error check. Further information about the MAC and LLC layer may be obtained, for example, from the title "Computer networks by Andrew S. Tanenbaum, Second Edition, Prentice-Hall International, Inc.; 1988, pp. 117 to 131, 196 to 212 and 262 to 265.

The radio transmission between the terminals 1 to 4 may be effected according to a TDMA, FDMA or CDMA method (TDMA=Time-Division Multiple Access; FDMA=Frequency-Division Multiple Access; CDMA=Code-Division Multiple Access). The methods may also be combined, as appropriate. For example, for a specific connection, a time slot of a frame is assigned to a terminal according to the TDMA method. The duration of a time slot could correspond to an integral part, or to the duration of one cell or of a multiple of a cell plus additional signalling and auxiliary information necessary for the radio transmission. The assignment of a time slot for a connection is determined, for example, prior to the transmission of a frame in dependence on the requirements of the respective terminal.

In the following, there is assumed that the data exchange between the terminals 1 to 4 takes place according to the TDMA method (Time-Division Multiple Access) on the radio channel. For the data transmission between two terminals (1 to 4), time slots are used which are assigned by the protocol belonging to the MAC layer (TDMA). A frame includes a channel or time slot (in the following referenced registration channel) full of collisions, a plurality of collision-free MAC signalling channels or signalling time slots, and transport channels or transport time slots for payload information. The registration channel may be accessed by each terminal, so that collisions with other terminals may arise. A terminal, once it has switched on, is registered over the registration channel with the terminal that executes the management function for the local area network. This terminal, whose controller 8 is appropriate for the management, will be referenced management terminal in the following.

A MAC signalling channel is fixedly assigned to a terminal and is used for exchanging the MAC signalling information between the terminal and the management terminal. The MAC signalling information is derived from the protocol belonging to the MAC layer and is used for, for example, dynamically reserving the transport time slots for the payload information. The respective terminal then informs the management terminal of how many cells are available for transmission in a buffer. For example, in dependence on the buffer fill of transmit cells of the terminals located in the whole radio coverage area, the management terminal assigns the transport channels to the respective terminals. The assignment is then generally renewed for each new time frame. Also the assignment for all the transport channels may be effected dynamically. This means that in a first frame, more channels are assigned to the transmission from the terminal 1 to the terminal 3 than channels are assigned to the transmission from the terminal 2 to the terminal 1, and in another frame, more channels are assigned to the transport of cells from the terminal 2 to the terminal 1 than channels are assigned to the transmission from the terminal 1 to the terminal 3 by the management terminal. A method for a MAC signalling may be taken from, for example, the publication "Medium Access Control Protocol for wireless, transparent ATM access" by D. Petras, IEEE Wireless Communication Systems Symposium, Long Island, N.Y., pp. 79 to 84, November 1995.

In the local area network shown in FIG. 1, a decision may be made, for example, by a dynamic algorithm distributed over the respective terminals (1 to 4), that the terminal 1 is the management terminal. During a frame, the management terminal can, for example, render a first transport time slot or channel available to the terminal 2 for the transmission of data to the terminal 3, the second transport channel to the terminal 3 for the transmission of data to the terminal 1, the third transport channel again to terminal 3 for the transmission of data to the terminal 1, the fourth transport channel to the terminal 1 for the transmission of data to the terminal 4, the fifth transport channel to the terminal 4 for the transmission of data to the terminal 2, and so on. After all the MAC signalling information has been received, the management terminal can execute an optimization process to render an optimum number of transport channels available to each terminal on average.

Furthermore, the management terminal is also used for setting up a connection and for disconnecting. Before a connection can be set up, a terminal is to be announced to the management terminal. Once a terminal has been put into operation, it sends a registration request over the registration channel to the management terminal, which request carries the identity number (ID number) assigned to the terminal. Subsequent to the reception of the registration request in the radio device 7 of the management terminal, the switch unit 9 sends the registration request to the controller 8 after querying the path memory 13. The management terminal stores the identity number of the terminal in a data bank coupled, for example, to the controller. The reception in the management terminal is acknowledged by means of an acknowledgement message sent to the terminal. In addition to the acknowledgement message, the terminal is also informed of the entry via the assigned MAC signalling channel.

In the following, the connection set-up between two users of terminals will be described by way of example. The terminal 2 having a user $A_1$ would like to set up a connection to a user $A_2$ of the terminal 4. The management terminal is the terminal 1. There is assumed that the exchange of ATM cells (user and signalling cells) is realized over the direct radio channel between two terminals via MAC signalling. The circuit arrangements of the MAC layer make said dynamic time slot assignment possible, irrespective of the contents of the ATM cells.

First, signalling cells containing a connection request are generated by the terminal 2 and transmitted to the management terminal. The controller 8 of the management terminal receives signalling cells which contain a connection request and then verifies whether such a connection is possible (for example, verifies whether terminal 4 is registered). If the connection is permitted, a valid VPI and VCI are assigned to this virtual link. By means of signalling cells, the management terminal announces to the controllers 8 of the terminals 2 and 4 that a virtual link is set up. Also the VPI and VCI assigned to the respective logical interface (UNI=User Network Interface) between station 5 and network interface 6, which identifiers are used by the respective station, are announced. The controller 8 of the management terminal has verified beforehand whether the virtual link has sufficient transmission capacity over the radio channel. Sufficient transmission capacity is to be available on average for the radio channel for a connection. This capacity may vary, however, from one frame to the next. The controller 8 of the management terminal is appropriate for the dynamic time slot assignment during the radio transmission. Furthermore, the management terminal informs the terminals 2 and 4 of the VPI and VCI provided for their radio channels. Thus, to the radio channel and the respective logical interface (UNI) between station 5 and the network interface 6, different, but corresponding VPI and VCI may be assigned at ATM level (cell stream level).

In the network interfaces 6 of the terminals 2 and 4, tables in certain path memories are still to be changed. For this purpose, a certain switch mode is set in the tables for the VPI and VCI of the logical interface (UNI) between station 5 and network interface 6. This change of table is triggered via signalling cells which are transmitted by the management terminal and are received and evaluated by the controllers 8 of the terminals 2 and 4. The actual change of tables is made by the controller 8 of each network interface 6 in the terminals 2 and 4. The VPI and VCI assigned to the radio channel are then stored in the path memory 13 and the VPI and VCI assigned to a logical interface (UNI) between station 5 and network interface 6 are stored in the path memory 14.

For example, the network interface 6 of a terminal conveys the cell received from an assigned station 5 to its respective transmit connection 10. The actual switching operation is executed by the switch 12 of the switch unit 9, which switch unit conveys the received cell stream after an evaluation of the table in the path memory 14.

Figure 4A:
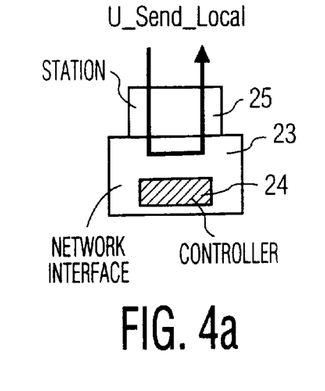

Different switch modes are stored in the path memories 13 and 14 for different types of connections, for the receiver of cells and, for the VPI and VCI. FIGS. 4a to 4g show the various switch modes which can be stored in the path memory 14. The cell stream relating to user cells is shown in an unbroken line and the cell stream relating to signalling cells is shown in a dashed line. FIG. 4a shows by way of example the network interface referenced 23, the controller contained therein referenced 24 and the station referenced 25.

FIG. 4a shows a U_Send_Local switch mode, in which user cells have been sent by a station and which are returned to the station via the switch unit 24. This switch mode is used for all the user cells of point-to-point or point-to-multipoint connections for which the receiver station is the same as the transmitter station.

Figure 4B:
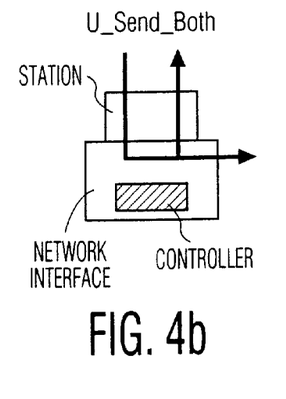

In the U_Send_Both switch mode shown in FIG. 4b, the station transmits user cells which are returned to the station and transmitted to another terminal via the radio interface. In the following, the radio interface is to be understood to mean the radio link including the respective appropriate radio devices 7 of two terminals. This switch mode is used for user cells in point-to-multipoint and broadcast connections. With respect to the point-to-multipoint connection, there should be observed that the transmitter station is also the receiver station and at least one further station of another terminal is a receiver station.

Figure 4C:
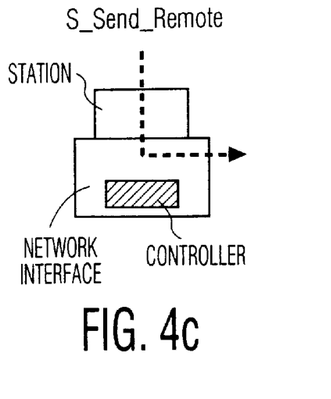

Signalling cells transmitted from a station to at least one further terminal are conveyed from the switch unit 9 to the transmit connection 10 in the S_Send_Remote switch mode shown in FIG. 4c. This switch mode is used for signalling cells of a point-to-point connection, in which mode a controller 8 of another terminal is the receiver of the signalling cells. Also in a point-to-multipoint connection, in which various controllers 8 of other terminals are the receivers, the S_Send_Remote switch mode occurs.

Figure 4D:
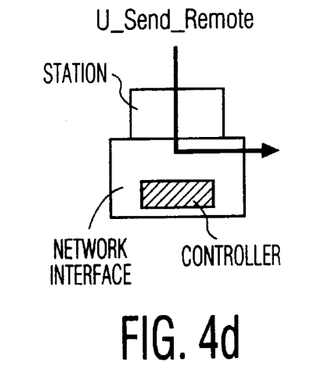

FIG. 4d shows the U_Send_Remote switch mode, which causes user cells to be transferred from the station to the transmit connection. This switch mode is used for user cells for a point-to-point or a point-to-multipoint connection. With both types of connection, the receivers are other terminals.

Figure 4E:
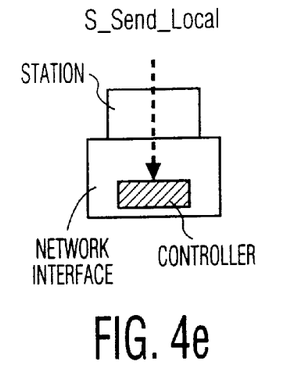
Figure 4F:
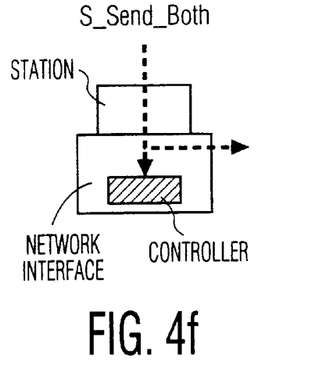

FIGS. 4e and 4f relate to switch modes of signalling cells which are transmitted by the station. In the S_Send_Local switch mode shown in FIG. 4e, all the received signalling cells of a point-to-point or a point-to-multipoint connection are transported to the controller 8 of the network interface which is connected to the transmitter station (local controller). The S_Send_Both switch mode shown in FIG. 4f is used for point-to-multipoint or broadcast connections. In this mode, the signalling cells are conveyed to the local controller 8 and to controllers 8 of the network interfaces of other terminals.

Figure 4G:
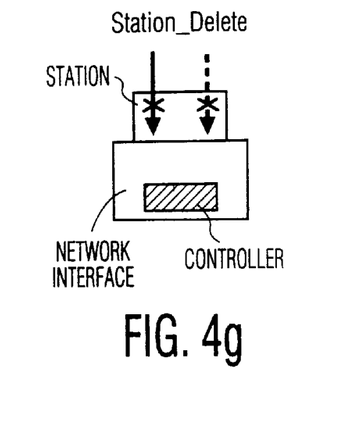

In the Delete switch mode shown in FIG. 4g, user cells or signalling cells are deleted in the switch unit 24, when they are not to reach other terminals, or when they are to be returned to the station, or to the local controller.

The Table in the path memory 14 may now have the following entries:

| Receive location of user(s) | Type of connection | Switch mode |
|---|---|---|
| station | unicast/user cell | U_Send_Local |
| station | multicast/user cell | U_Send_Local |
| other terminal | unicast/user cell | U_Send_Remote |
| other terminal(s) | multicast/user cell | U_Send_Remote |
| station and at least one other terminal | multicast/user cell | U_Send_Both |
| irrelevant | broadcast/user cell | U_Send_Both |
| local controller | unicast/signalling cell | S_Send_Local |
| local controller | multicast/signalling cell | S_Send_Local |
| other controller | unicast/signalling cell | S_Send_Remote |
| other controllers | multicast/signalling cell | S_Send_Remote |
| local controller and at least one other controller | multicast/signalling cell | S_Send_Both |
| irrelevant | broadcast/signalling cell | S_Send_Both |
| irrelevant | all non-existent connections | Station_Delete |

The Table further has VPI and VCI entries (not shown here). For example, under a first VPI and VCI entry, a user of another terminal may act as a receive location, a unicast or point-to-point connection may act as the type of connection for a user cell and U_Send_Remote may be stated as a switch mode. Furthermore, a VPI and VCI entry may have various users of the local controller as a receive location, a multicast or point-to-multipoint connection as a type of connection for a signalling cell and S_Send_Local may be entered as a switch mode. A further observation in this context is that for the connection set-up and disconnection, certain predefined VCI and VPI combinations are reserved for the signalling cells.

The Table indicates the switch mode for all receive locations and types of connection of the cells coming in from the station. The local controller is the controller 8 of the network interface coupled to the transmitter station, and a remote controller is a controller 8 of the network interface of another terminal. It may happen that, for example, a cell is received which contains a VPI and VCI featuring a broadcast connection. In that case, the U__Send__Both, S__Send__Both switch mode respectively, is used for a user cell and a signal cell, irrespective of the receive location. For all the non-existent connections having an irrelevant receive location, the cells are deleted (Station__Delete switch mode).

Figure 5A:
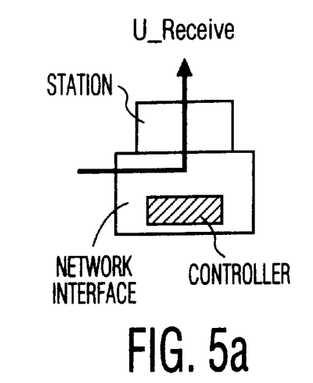
Figure 5B:
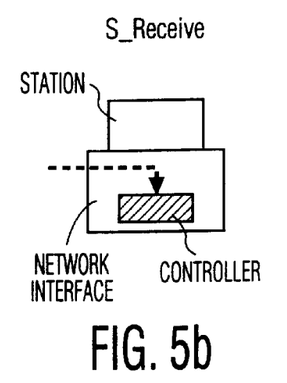
Figure 5C:
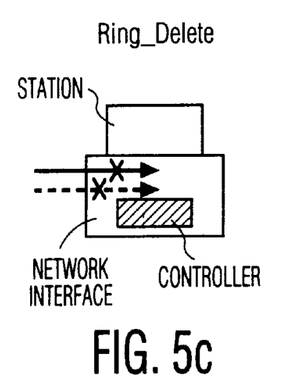

The switch modes which can be stored in a table in the path memory 13, are shown in FIGS. 5a to 5c. The U__Receive switch mode in FIG. 5a makes it possible to convey the cells which come in from the radio interface and are taken to the station. For all types of connections (unicast, multicast and broadcast connections) for which the station is the receiver, this switch mode can be used.

FIG. 5b shows the S__Receiver switch mode, in which signalling cells of a point-to-point, a point-to-multipoint or broadcast connection are transported from the radio interface to the network interface 6, and which are conveyed to the local controller 8 by the switch unit 9. With the Ring__Delete switch mode shown in FIG. 5, user cells or signalling cells are deleted in the switch unit 24 when they are not to reach the station 5 or the local controller 8.

The path memory 13 may include a Table having the following entries:

| Transmit location of the user(s) | Type of connection | Switch mode |
|---|---|---|
| auβerhalb des Terminals outside the terminal | alle/Anwenderzelle all/signalling cell | U__Receive S__Receive |
| outside the terminal | all non-existent connections | Ring__Delete |

As has already been observed with respect to the other Table, this Table also contains VPI and VCI entries which are not shown for virtual links. The three switch modes relate to all the respective types of connections (unicast, multicast and broadcast connections). The user sending a cell stream may belong to a station or to a controller of another terminal.

Figure 6:
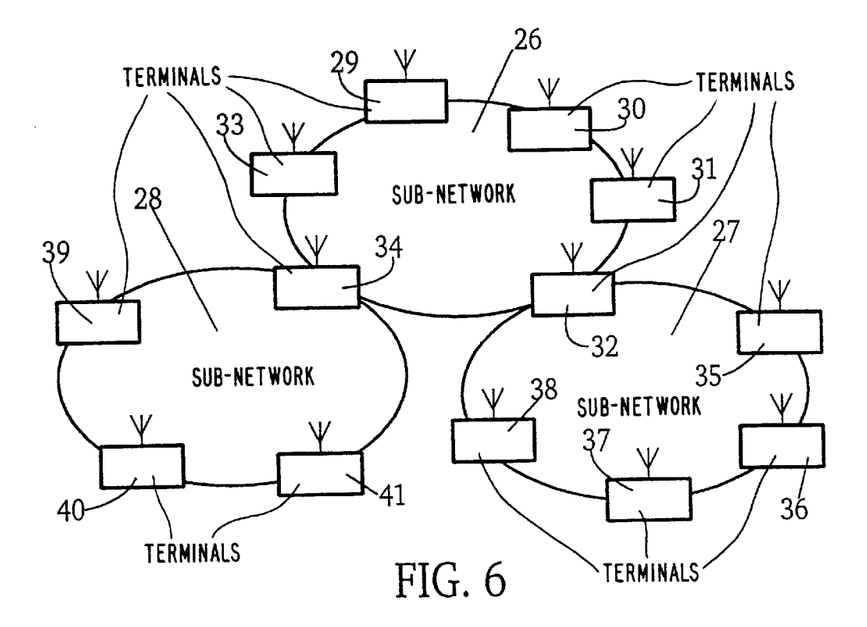
FIG. 6 shows a local area network formed by terminals with three sub-networks which terminals communicate via radio links.

In the path memory 13 may be stored two further switch modes, when the local area network comprises a plurality of sub-networks. In FIG. 6 is shown an example of three sub-networks 26 to 28 and terminals 29 to 41. The terminals 29 to 34 form part of the sub-network 26, the terminals 32 and 35 to 38 form part of the sub-network 27, and the terminals 34 and 39 to 41 form part of the sub-network 28. The terminals 32 and 34 are bridge terminals which belong to two sub-networks and run along the connections between the two sub-networks. A change of the number assigned to a virtual link, which number is featured by the combination of VPI and VCI, can be made in the bridge terminals. Without such bridge terminals 32 and 34 it would be impossible, for example, to set up a connection between users of the terminals 29 and 40 in the sub-networks 26 and 28.

Figure 7A:
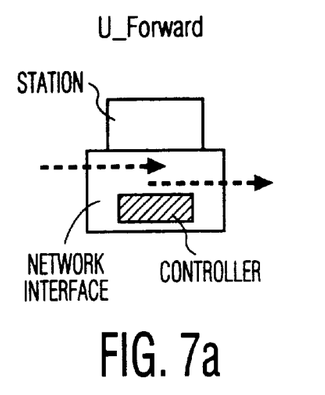
Figure 7B:
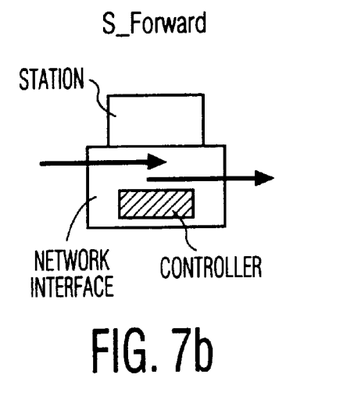

The two above-mentioned additional switch modes which can be stored in the path memory 13 are shown in FIGS. 7a and 7b. The S__Forward switch mode shown in FIG. 7a denotes the change of the number of the virtual link in the network interface of a bridge terminal for a signalling cell. The FIG. 7b shows the U__Forward switch mode, in which the number of the virtual link of a user cell is changed. The Table shown above for a path memory 13 has further entries when the path memory 13 forms part of a bridge terminal.

| Transmit location of user(s) | Receive location of user(s) | Type of connection | Switch mode |
|---|---|---|---|
| outside the terminal | terminal itself | all/user cell | U__Receive |
| outside the terminal | terminal itself | all/signalling cell | S__Receive |
| outside the terminal | next sub-network with conversion | all/user cell | U__Forward |
| outside the terminal | next sub-network conversion | all/user cell | S__Forward with |
| outside the terminal | irrelevant | all non-existent connections | Ring__Delete |

The Table additionally shows the receive location of one or various users. In the U__Receive and S__Receive switch modes, the receive location is the terminal itself, which carries out the switch operation by means of the switch unit 9 included in the network interface 6. The additional U__Forward and S__Forward switch modes relate to cells which are to be transmitted to another sub-network. The number collectively formed by the VPI and VCI is then changed in the receive circuit 15 (VPI/VPI conversion).

I claim:

1. A local area network operating in the asynchronous transfer mode comprising a plurality of terminals (1 to 4) which are formed each by a station (5), a radio device (7) for transmitting data between the terminals (1 to 4) and a network interface (6) including a controller (8) at least provided for setting up a connection, and comprising a switch unit (9) for switching cells between radio device (7), station (5) and controller (8), characterized in that the terminals (1 to 4) are provided each for directly exchanging data with another terminal (1 to 4) and in that one terminal (1 to 4) executes management functions in the network and exchanges data by means of at least one virtual link between a local user and a user of another terminal (1 to 4).

2. The local area network as claimed in claim 1, characterized in that the network comprises a plurality of sub-networks (26 to 28) having each various terminals (29 to 41) and in that at least one terminal (32, 34) forms part of two neighbouring sub-networks (26 to 28) and transmits cells between the sub-networks (26 to 28).

3. The local area network as claimed in claim 1, characterized in that the switch unit (9) comprises a first receive circuit (16) assigned to an output connection (17) of the station (5) which first receive circuit is coupled to a first path memory (14), and a second receive circuit (15) assigned to a receive connection (11) of the network interface (6) which second receive circuit is coupled to a second path memory (13, in that each receive circuit (15, 16) evaluates the header field of a received cell and in that at least one receive circuit (15, 16) is used for extracting a switch mode from the assigned path memory (13, 14) based on the information recovered from the header field.

4. The local area network as claimed in claim 3, characterized in that the first path memory (14) is used for storing
 a first switch mode for a connection from the station and (5) back to the station (5), in which mode the switch unit (9) couples the output and input connections (18, 17) of the station (5),
 a second switch mode for a connection from the station and (5) back to the station (5) and from the station (5) to another terminal (1 to 4), in which mode the switch unit (9) couples the output connection (17) of the station (5) to the input connection (18) of the station (5) and to the transmit connection (10) of the network interface (6), a third switch mode for a connection between the station (5) and at least one other terminal (1 to 4), in which mode the switch unit (9) couples the output connection (17) of the station (5) to the transmit connection (10) of the network interface (6), a fourth switch mode for a connection between the station (5) and the local controller (8), in which mode the switch unit (9) couples the output connection (17) of the station (5) to the local controller (8), a fifth switch mode for a connection between the station (5) and the local controller and at least one controller (8) of another terminal (1 to 4), in which mode the switch unit (9) couples the output connection (17) of the station (5) to the local controller (8) and to the transmit connection (10) of the network interface (6), and a sixth switch mode for deleting cells coming in from the station (5) and containing non-existent connections.

5. The local area network as claimed in claim 3, characterized in that the second path memory (13) is used for storing a seventh switch mode for a connection from the radio interface to the station (5), in which mode the switch unit (9) couples the receive connection (11) of the network interface (6) to the input connection (18) of the station (5), an eighth switch mode for a connection between the radio interface and the local controller (8), in which mode the switch unit (9) couples the receive connection (11) of the network interface (6) to the local controller (8), and a ninth switch mode for deleting cells coming from the receive connection (11) of the network interface (6) and containing non-existent connections.

6. The local area network as claimed in claim 5, characterized in that the second path memory (13) in a terminal (1 to 4), which terminal forms part of at least two neighbouring sub-networks (26 to 28) is additionally used for storing a tenth switch mode for a connection between a terminal (32, 34) of a first sub-network (26 to 28) and a terminal (32, 34) of a second sub-network (26 to 28), in which mode the switch unit (9) couples the receive and transmit connections (11, 10) of the network interface (6).

7. A local area network as claimed in claim 6, characterized in that for setting up a connection, the controller (8) stores the switch mode belonging to the virtual link and at least one path memory (13, 14).

8. A local area network as claimed in claim 7, characterized in that the VCI (Virtual Channel Identifier) and VPI (Virtual Path Identifier) contained in a cell together form the identity of a virtual link and in that the path memory (13, 14) at least stores the type of connection, the type of cell and the switch mode under this identity.

9. A local area network as claimed in claim 1, characterized in that a terminal (1 to 4) comprises a radio device (7) having a radio frequency circuit (20), a modem (21) and a protocol device (22), in that the radio devices (7) of two terminals (1 to 4) exchange data and in that a terminal (1 to 4) exchanges identity data over a registration channel, MAC signalling data (MAC=Medium Access Control) over a MAC signalling channel and payload information over at least one transport channel and in that the payload information contains at least part of a cell.

10. A local area network as claimed in claim 9, characterized in that the terminal (1 to 4) used for executing management functions controls the connection set-up and disconnection and the dynamic assignment of transport channels for the individual terminals (1 to 4).

11. A terminal (1 to 4) for a local area network operating in the asynchronous transfer mode, the network comprising a plurality of further terminals (1 to 4), a station (5), a radio device (7) for exchanging data with other terminals (1 to 4) and a network interface (6) which includes a controller provided at least for the connection set-up and a switch unit (9) for switching cells between radio device (7), station and controller (8), characterized in that the terminal (1 to 4) is used for the direct exchange of data with another terminal (1 to 4) and in that the terminal (1 to 4) is used for executing management functions in the network and for exchanging data by means of at least one virtual link between a user of the respective terminal and a user of another terminal (1 to 4).

* * * * *